United States Patent
Takashima et al.

(10) Patent No.: US 11,339,452 B2
(45) Date of Patent: *May 24, 2022

(54) HOT-PRESSED STEEL SHEET MEMBER AND METHOD FOR PRODUCING SAME

(71) Applicant: JFE STEEL CORPORATION, Tokyo (JP)

(72) Inventors: Katsutoshi Takashima, Tokyo (JP); Takayuki Futatsuka, Tokyo (JP); Kentaro Sato, Tokyo (JP); Shimpei Yoshioka, Tokyo (JP); Yoshihiko Ono, Tokyo (JP); Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/762,501

(22) PCT Filed: Nov. 7, 2018

(86) PCT No.: PCT/JP2018/041381
§ 371 (c)(1),
(2) Date: May 8, 2020

(87) PCT Pub. No.: WO2019/093384
PCT Pub. Date: May 16, 2019

(65) Prior Publication Data
US 2021/0130919 A1    May 6, 2021

(30) Foreign Application Priority Data
Nov. 13, 2017    (JP) .............................. JP2017-218304

(51) Int. Cl.
| | |
|---|---|
| *C22C 38/58* | (2006.01) |
| *C22C 38/54* | (2006.01) |
| *C22C 38/52* | (2006.01) |
| *C22C 38/50* | (2006.01) |
| *C22C 38/48* | (2006.01) |
| *C22C 38/46* | (2006.01) |
| *C22C 38/44* | (2006.01) |
| *C22C 38/42* | (2006.01) |
| *C22C 38/06* | (2006.01) |

(Continued)

(52) U.S. Cl.
CPC .............. *C21D 9/46* (2013.01); *B32B 15/012* (2013.01); *B32B 15/013* (2013.01); *B32B 15/04* (2013.01); *B32B 15/043* (2013.01); *B32B 15/18* (2013.01); *C21D 1/18* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01);

(Continued)

(58) Field of Classification Search
CPC .. C21D 8/0205; C21D 8/0226; C21D 8/0236; C21D 8/0263; C21D 8/0273; C21D 6/005; C21D 6/008; C21D 9/46; C21D 1/18; C21D 2211/001; C21D 2211/008; B32B 15/013; B32B 15/012; B32B 15/04; B32B 15/043; B32B 15/18; C22C 38/001; C22C 38/002; C22C 38/008; C22C 38/02; C22C 38/04; C22C 38/06; C22C 38/12; C22C 38/42; C22C 38/44; C22C 38/46; C22C 38/48; C22C 38/50; C22C 38/52; C22C 38/54; C22C 38/58; C22C 38/60; C22C 38/10; C22C 38/105; C22C 38/14; C22C 38/16; C22C 38/18; C22C 38/20; C22C 38/22; C22C 38/24; C22C 38/26; C22C 38/28; C22C 38/30; C22C 38/32; C22C 38/34; C22C 38/38; C22C 38/40; C23C 2/06; C23C 2/12; C23C 2/26; C23C 2/40; C23C 2/28; C23C 30/00; C23C 30/005; Y10T 428/12757; Y10T 428/12799; Y10T 428/12958; Y10T 428/12972; Y10T 428/26

See application file for complete search history.

(56) References Cited

U.S. PATENT DOCUMENTS

| | | |
|---|---|---|
| 8,628,630 B2 | 1/2014 | Kobayashi et al. |
| 9,145,594 B2 | 9/2015 | Toji et al. |

(Continued)

FOREIGN PATENT DOCUMENTS

| | | |
|---|---|---|
| CN | 102482750 A | 5/2012 |
| CN | 102939399 A | 2/2013 |

(Continued)

OTHER PUBLICATIONS

Feb. 5, 2019, International Search Report issued in the International Patent Application No. PCT/JP2018/041381.

(Continued)

*Primary Examiner* — Michael E. La Villa
(74) *Attorney, Agent, or Firm* — Kenja IP Law PC

(57) ABSTRACT

Disclosed is a hot-pressed steel sheet member having a tensile strength of 1780 MPa or more and excellent bending collapsibility. The hot-pressed steel sheet member includes: a specific chemical composition; a microstructure in which an average grain size of prior austenite grains is 8 μm or less, a volume fraction of martensite is 90% or more, and a solute C content is 25% or less of a total C content; and a tensile strength of 1780 MPa or more.

12 Claims, No Drawings

(51) Int. Cl.
  *C22C 38/02* (2006.01)
  *C22C 38/00* (2006.01)
  *C22C 38/60* (2006.01)
  *B32B 15/01* (2006.01)
  *C21D 6/00* (2006.01)
  *C21D 8/02* (2006.01)
  *C21D 9/46* (2006.01)
  *C23C 2/06* (2006.01)
  *C23C 2/12* (2006.01)
  *C21D 1/18* (2006.01)
  *C22C 38/04* (2006.01)
  *C22C 38/12* (2006.01)
  *C23C 2/26* (2006.01)
  *C23C 2/40* (2006.01)
  *C23C 2/28* (2006.01)
  *C23C 30/00* (2006.01)
  *B32B 15/04* (2006.01)
  *B32B 15/18* (2006.01)
  *C22C 38/26* (2006.01)
  *C22C 38/18* (2006.01)
  *C22C 38/28* (2006.01)
  *C22C 38/34* (2006.01)
  *C22C 38/24* (2006.01)
  *C22C 38/14* (2006.01)
  *C22C 38/30* (2006.01)
  *C22C 38/20* (2006.01)
  *C22C 38/32* (2006.01)
  *C22C 38/40* (2006.01)
  *C22C 38/10* (2006.01)
  *C22C 38/22* (2006.01)
  *C22C 38/38* (2006.01)
  *C22C 38/16* (2006.01)

(52) U.S. Cl.
  CPC ............. *C22C 38/28* (2013.01); *C22C 38/30* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *C23C 2/06* (2013.01); *C23C 2/12* (2013.01); *C23C 2/26* (2013.01); *C23C 2/28* (2013.01); *C23C 2/40* (2013.01); *C23C 30/00* (2013.01); *C23C 30/005* (2013.01); *C21D 2211/001* (2013.01); *C21D 2211/008* (2013.01); *Y10T 428/12757* (2015.01); *Y10T 428/12799* (2015.01); *Y10T 428/12958* (2015.01); *Y10T 428/12972* (2015.01); *Y10T 428/26* (2015.01)

(56) References Cited

U.S. PATENT DOCUMENTS

| | | | |
|---|---|---|---|
| 2013/0095347 | A1 | 4/2013 | Kawasaki et al. |
| 2019/0003004 | A1 | 1/2019 | Cho et al. |
| 2020/0332382 | A1* | 10/2020 | Takashima ............ C22C 38/008 |
| 2021/0130919 | A1 | 5/2021 | Takashima et al. |

FOREIGN PATENT DOCUMENTS

| | | |
|---|---|---|
| CN | 102985571 A | 3/2013 |
| EP | 2468911 A1 | 6/2012 |
| JP | 2010150612 A | 7/2010 |
| JP | 2010174283 A | 8/2010 |
| JP | 2011063877 A | 3/2011 |
| JP | 2011202205 A | 10/2011 |
| JP | 2013040390 A | 2/2013 |
| JP | 2014015638 A | 1/2014 |
| JP | 2014118613 A | 6/2014 |
| JP | 2016003389 A | 1/2016 |
| KR | 1020120127658 A | 11/2012 |
| KR | 101291010 B1 | 7/2013 |
| WO | 2017111456 A1 | 6/2017 |

OTHER PUBLICATIONS

Jul. 9, 2020, the Extended European Search Report issued by the European Patent Office in the corresponding European Patent Application No. 18876372.6.
Sep. 27, 2021, Office Action issued by the Korean Intellectual Property Office in the corresponding Korean Patent Application No. 10-2020-7016710 with English language.
Aug. 12, 2021, Office Action issued by the China National Intellectual Property Administration in the corresponding Chinese Patent Application No. 201880072850.9 with English language search report.
Mar. 2, 2021, Office Action issued by the China National Intellectual Property Adminislialion in the corresponding Chinese Patent Application No. 201880072850.9 with English language search report.

* cited by examiner

HOT-PRESSED STEEL SHEET MEMBER AND METHOD FOR PRODUCING SAME

TECHNICAL FIELD

This disclosure relates to a hot-pressed steel sheet member, and in particular to a hot-pressed steel sheet member having both a tensile strength of 1780 MPa or more and excellent bending collapsibility. This disclosure also relates to a method for producing the hot-pressed steel sheet member.

BACKGROUND

In recent years, along with growing concern over environmental problems, $CO_2$ emission regulations are being further tightened, and in the automobile field, reduction of automobile body weight for fuel efficiency improvement has become an issue. Therefore, sheet metal thinning of automotive parts by using high-strength steel sheets has been advanced, specifically, application of steel sheets having a tensile strength (TS) of 1780 MPa or more is being considered.

However, high-strength steel sheets used in structural parts and reinforcing members of automobiles are required to have excellent formability and high dimensional accuracy after forming. Since steel sheets having a tensile strength of 1780 MPa or more are low in ductility, there is a problem that cracks are likely to occur during cold press forming. Further, since steel sheets having a tensile strength of 1780 MPa or more are high in yield stress, the steel sheets are susceptible to large springback after subjection to cold press forming. Accordingly, in the way of cold pressing a steel sheet having a tensile strength of 1780 MPa or more, a high dimensional accuracy can not be obtained after forming.

Therefore, in recent years, as a technique for achieving both high strength and high dimensional accuracy, press forming in hot pressing (also called hot stamping, die quenching, press quenching, or the like) has attracted attention. Hot pressing is a molding process in which a steel sheet is heated to a temperature range of the austenite single phase, and molded at a high temperature while being rapidly cooled (quenched) by being brought into contact with the mold. Since molding is performed in a state where the steel sheet is softened by being heated and the strength of the steel sheet is increased by quenching, hot pressing makes it possible to obtain a member having both high strength and high dimensional accuracy. From such features, hot pressing is utilized in the manufacture of members such as automotive members for which strength and accuracy are required.

For example, JP2013-040390A (PTL1) proposes a method for producing a hot-pressed member used as an automotive member. In the method of PTL 1, quenching treatment and heat treatment are performed after hot pressing to improve the toughness of the hot-pressed member.

CITATION LIST

Patent Literature
PTL 1: JP2013-040390A

SUMMARY

Technical Problem

Automotive members, in particular framework parts, are required to have excellent bending collapsibility in addition to excellent strength. The bending collapsibility refers to the property of collapsing in plastic deformation without causing cracks in the member upon bending deformation. In order to ensure the crashworthiness of automobiles, automotive members are required to be excellent in bending collapsibility.

However, a problem was found that when the member is quenched during hot pressing as described above so as to have a tensile strength of 1780 MPa or more after being pressed, the martensite remains as-quenched, making the steel sheet prone to cracking without plastic deformation upon bending deformation.

Further, according to the method of PTL 1, a certain improvement in toughness is achieved by performing heat treatment. It was found, however, that even in the hot-pressed member described in PTL 1, sufficient bending collapsibility can not be obtained when the member has a tensile strength of 1780 MPa or more after being pressed.

For assurance of weight reduction and crashworthiness required for automotive framework parts, the member after hot pressing is required to have both a high tensile strength of 1780 MPa or more and excellent bending collapsibility. However, it is difficult to improve the bending collapsibility of a hot-pressed steel sheet member having TS of 1780 MPa or more, methods for obtaining a hot-pressed steel sheet member having both of these properties have not been developed in the art.

It would thus be helpful to provide a hot-pressed steel sheet member having both a tensile strength of 1780 MPa or more and excellent bending collapsibility.

Solution to Problem

The present inventors reached the following findings as a result of study in order to solve the above problems.

(1) To improve the bending collapsibility of the hot-pressed member, it is important to control the solute C content of the hot-pressed member. In the case where the components of the steel sheet are adjusted to ensure a tensile strength of 1780 MPa or more, the solute C content in the martensite as-quenched increases. As a result, the hardness of the member is increased, but the member becomes brittle. Therefore, by performing heat treatment to cause precipitation of solute C, it is possible to improve the bending collapsibility while ensuring a certain degree of hardness. Adjustment of the solute C content can be made by performing heat treatment under a predetermined condition after the steel sheet microstructure is transformed into martensite by hot pressing.

(2) In order to improve the bending collapsibility of the hot-pressed member, in addition to the control of the solute C content, it is important to further add a predetermined amount of Sb. Heating for hot pressing is generally carried out using an atmospheric furnace or the like, in an atmosphere in which oxygen is present. Therefore, a surface layer of the steel sheet is decarburized, causing hardness variation. Therefore, by preventing decarburization by the addition of Sb, it is possible to equalize the hardness distributions at the sheet surface of the steel sheet, and consequently to improve the bending collapsibility of the hot-pressed steel sheet member.

The present disclosure was completed based on the above findings, and the primary features thereof are as follows.

1. A hot-pressed steel sheet member, comprising: a chemical composition containing (consisting of), in mass %, C: 0.30% or more and less than 0.50%, Si: 0.01% or more and 2.0% or less, Mn: 0.5% or more and 3.5% or less, Sb:

0.001% or more and 0.020% or less, P: 0.05% or less, S: 0.01% or less, Al: 0.01% or more and 1.00% or less, and N: 0.01% or less, with the balance being Fe and inevitable impurities; a microstructure in which an average grain size of prior austenite grains is 8 μm or less, a volume fraction of martensite is 90% or more, and a solute C content is 25% or less of a total C content; and a tensile strength of 1780 MPa or more.

2. The hot-pressed steel sheet member according to 1., wherein the chemical composition further contains, in mass %, Nb: 0.001% or more and 0.10% or less, and a ratio of a C content in mass % to a Nb content in mass %, C/Nb, is from 22 to 100.

3. The hot-pressed steel sheet member according to 1. or 2., wherein the chemical composition further contains, in mass %, at least one selected from the group consisting of Mo: 0.35% or less, Cr: 0.35% or less, Ti: 0.15% or less, B: 0.0050% or less, Ca: 0.005% or less, V: 0.05% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

4. The hot-pressed steel sheet member according to any one of 1. to 3., further comprising, on a surface thereof, an Al or Al-alloy coated or plated layer or a Zn or Zn-alloy coated or plated layer.

5. A method for producing a hot-pressed steel sheet member, comprising: heating a cold-rolled steel sheet having the chemical composition as recited in any one of 1. to 3. to a heating temperature of an Ac3 transformation temperature or higher and 1000° C. or lower; hot pressing the heated cold-rolled steel sheet to obtain a hot-pressed steel sheet; cooling the hot-pressed steel sheet to Mf point or lower; and subjecting the cooled hot-pressed steel sheet to heat treatment under a set of conditions including a heating temperature of 50° C. to 300° C. and a holding time of 5 seconds to 3600 seconds.

Advantageous Effect

According to the present disclosure, it is possible to provide a hot-pressed steel sheet member having a tensile strength of 1780 MPa or more and excellent bending collapsibility.

DETAILED DESCRIPTION

Hereinafter, a method for carrying out the present disclosure will be specifically described.

[Chemical Composition]

The hot-pressed steel sheet member according to the present disclosure comprises a steel sheet portion having the above chemical composition. Hereinafter, the reasons for the limitations will be described. The "%" representations below relating to the chemical composition are in "mass %".

C: 0.30% or More and Less than 0.50%

C is an element effective for increasing the strength of a steel sheet, and is important for enhancing the strength of the steel by strengthening the martensite after hot pressing. However, when the C content is less than 0.30%, the hardness of martensite after hot pressing is insufficient, and the expected tensile strength can not be obtained. Therefore, the C content is 0.30% or more. On the other hand, when the C content is 0.50% or more, it becomes difficult to sufficiently reduce the solute C content in the heat treatment after cooling, and the bending collapsibility is lowered. Therefore, the C content is less than 0.50%, preferably less than 0.45%, and more preferably less than 0.40%.

Si: 0.01% or More 2.0% or Less

Si has the action of solid solution strengthening the ferrite, and is an effective element for increasing the strength. However, since the excessive addition of Si lowers the chemical convertibility, the Si content is 2.0% or less, and preferably 1.3% or less. On the other hand, providing an ultra-low Si content increases the cost, and thus the Si content is 0.01% or more.

Mn: 0.5% or More and 3.5% or Less

Mn is an element having the effect of increasing the quench hardenability, and contributes to the formation of martensite, i.e., the increase in strength, during cooling after hot pressing. To obtain this effect, the Mn content is set to 0.5 or more, and preferably 1.0% or more. On the other hand, when the Mn content is more than 3.5%, Mn bands are excessively generated, and it is impossible to sufficiently reduce the solute C content through heat treatment, resulting in lower bending collapsibility. Therefore, the Mn content is 3.5% or less, and preferably 2.5% or less.

Sb: 0.001% or More and 0.020% or Less

Sb has the effect of suppressing the occurrence of a decarburized layer in a surface layer portion of the steel sheet in a series of processes including heating, hot pressing, and cooling. Therefore, the hardness distributions on the sheet surface become uniform by the addition of Sb, resulting in improved bending collapsibility. To obtain this effect, the Sb content is 0.001% or more. On the other hand, when the Sb content exceeds 0.020%, Sb segregates at grain boundaries, and cracking occurs originating from the grain boundaries during bending collapse, resulting in lower bending collapsibility. Therefore, the Sb content is 0.020% or less.

P: 0.05% or Less

P is an element that contributes to increasing the strength by solid solution strengthening. However, when P is added excessively, segregation at grain boundaries becomes significant and causes embrittlement of the grain boundaries, resulting in lower bending collapsibility. Therefore, the P content is 0.05% or less, and preferably 0.04% or less. On the other hand, the lower limit of the P content is not particularly limited, yet providing an ultra-low P content leads to an increase in steel manufacturing cost. Therefore, the P content is preferably 0.0005% or more.

S: 0.01% or Less

When the S content is excessively high, sulfide inclusions such as MnS are generated in large quantities, and cracking occurs originating from the inclusions, resulting in lower bending collapsibility. Therefore, the S content is 0.01% or less, and preferably 0.005% or less. On the other hand, the lower limit of the Si content is not particularly limited, yet providing an ultra-low S content causes an increase in steel manufacturing cost. Therefore, the S content is preferably 0.0002% or more.

Al: 0.01% or More and 1.00% or Less

Al is an element required for deoxidation. To obtain this effect, the Al content is 0.01% or more. However, the effect is saturated when the Al content exceeds 1.00%. Therefore, the Al content is 1.00% or less, and preferably 0.50% or less.

N: 0.01% or Less

N forms a coarse nitride and lowers the bending collapsibility. When the N content is more than 0.01%, the effect on the bending collapsibility becomes significant. Therefore, the N content is 0.01% or less, and preferably 0.008% or less.

The steel sheet according to an embodiment of the present disclosure may have a chemical composition containing the above components, with the balance being Fe and inevitable impurities.

According to another embodiment of the present disclosure, the chemical composition may further contain Nb in the following amounts.

Nb: 0.001% or More and 0.10% or Less

Nb is an element that contributes to increasing the strength by forming fine carbonitrides. In addition, Nb is an element that contributes to the improvement of bending collapsibility since it achieves the refinement of the austenite grain size during hot pressing. Therefore, by adding Nb, it is possible to further improve the bending collapsibility. When adding Nb, in order to obtain the above effect, the Nb content is set to 0.001% or more, and preferably 0.003% or more. However, adding Nb in large quantities does not increase the above effect, rather resulting in increased cost. Therefore, Nb content is 0.10% or less, preferably 0.08% or less, more preferably 0.03% or less.

C/Nb: From 22 to 100

When adding Nb, it is preferable that the ratio of the C content in mass % to the Nb content in mass %, C/Nb, in the steel sheet be from 22 to 100. When the C/Nb exceeds 100, the amount of formation of Nb-based carbides is reduced and the solute C content increases. Since Nb-based carbides have the effect of suppressing the growth of austenite grains by the pinning effect, the reduction of Nb-based carbides leads to the coarsening of grains after hot pressing, which may result in lower bending collapsibility. Further, when the solute C content is increased, the toughness decreases, which may also result in lower bending collapsibility. It is thus preferable that C/Nb be 100 or less, more preferably 80 or less, and even more preferably 70 or less. On the other hand, the C/Nb is less than 22, since Nb-based carbides serving as starting points for cracking are generated in large quantities, which may result in lower bending collapsibility. Although C is an element having the effect of increasing the strength of the steel, when C/Nb is below 22, the proportion of C consumed by the formation of Nb-based carbides increases, and as a result, the tensile strength may be lowered. Therefore, the C/Nb is preferably 22 or more, more preferably 25 or more, and more preferably 30 or more. By controlling the ratio of the C content to the Nb content, C/Nb, in this way, it is possible to achieve both higher strength and higher bending collapsibility.

According to another embodiment of the present disclosure, the chemical composition may optionally contain at least one of the following elements.

Mo: 0.35% or Less

Mo is an element having the effect of increasing the quench hardenability, and contributes to the formation of martensite, i.e., the increase in strength, during cooling after hot pressing. However, excessively adding Mo does not increase the effect, rather resulting in increased cost. Further, excessive Mo addition lowers the chemical convertibility. Therefore, when Mo is added, the Mo content is 0.35% or less. On the other hand, the lower limit of the Mo content is not particularly limited, from the viewpoint of increasing the addition effect of Mo, the Mo content is preferably 0.005% or more, and more preferably 0.01% or more.

Cr: 0.35% or Less

Cr, like Mo, is also an element having the effect of increasing the quench hardenability, and contributes to the formation of martensite, i.e., the increase in strength, during cooling after hot pressing. However, excessively adding Cr does not increase the effect, but rather ends up increasing the cost. Further, Cr forms a surface oxide, lowering the coatability. Therefore, when Cr is added, the Cr content is 0.35% or less. On the other hand, the lower limit of the Cr content is not particularly limited, from the viewpoint of increasing the addition effect of Cr, the Cr content is preferably 0.005% or more, and more preferably 0.01% or more.

Ti: 0.10% or Less

Ti is an element that contributes to increasing the strength by forming a fine carbonitride. Ti also contributes to improving the bending collapsibility by refining the austenite particle size during hot pressing. However, when a large amount of Ti is added, elongation after hot pressing is significantly reduced. Therefore, when Ti is added, the Ti content is 0.10% or less, and preferably 0.08% or less. On the other hand, the lower limit of the Ti content is not particularly limited, yet from the viewpoint of increasing the addition effect of Ti, the Ti content is preferably 0.005% or more.

B: 0.0050% or Less

B is an element having the effect of increasing the quench hardenability, and contributes to the formation of martensite, i.e., the increase in strength during cooling after hot pressing. In addition, since B segregates at the grain boundaries and improves the grain boundary strength, B is effective in improving the bending collapsibility. However, excessive addition of B leads to formation of coarse precipitates with C, lowering the bending collapsibility. Therefore, when B is added, the B content is 0.0050% or less, and preferably 0.0035% or less. On the other hand, the lower limit of the B content is not particularly limited, yet from the viewpoint of increasing the addition effect of B, the B content is preferably 0.0002% or more.

Ca: 0.005% or Less

Ca is an element that controls the shapes of sulfides and oxides, that has the effect of suppressing the formation of coarse MnS, and that improves the bending collapsibility. However, excessive addition of Ca deteriorates the workability. Therefore, when Ca is added, the Ca content is 0.005% or less. On the other hand, the lower limit of the Ca content is not particularly limited, yet from the viewpoint of increasing the addition effect of Ca, the Ca content is preferably 0.0005% or more.

V: 0.05% or Less

V is an element that contributes to increasing the strength by forming a fine carbonitride. However, excessive addition of V deteriorates the bending collapsibility. Therefore, when V is added, the V content is 0.05% or less. On the other hand, the lower limit of the V content is not particularly limited, yet from the viewpoint of increasing the addition effect of V, the V content is preferably 0.01% or more Cu: 0.50% or Less Cu is an element that contributes to increasing the strength by solid solution strengthening. Cu also contributes to improving the delayed fracture resistance by increasing the corrosion resistance. However, excessive addition does not increase the effect, but rather surface defects caused by Cu are more likely to occur. Therefore, when Cu is added, the Cu content is 0.50% or less. On the other hand, the lower limit of the Cu content is not particularly limited, yet from the viewpoint of increasing the addition effect of Cu, the Cu content is preferably 0.05% or more.

Ni: 0.50% or Less

Ni, like Cu, is an element that contributes to improving the delayed fracture resistance by increasing the corrosion resistance. When added with Cu, Ni also has the effect of suppressing surface defects caused by Cu. Therefore, the addition of Ni is particularly effective when adding Cu. However, a large amount of Ni addition decreases the bending collapsibility, resulting in lower tensile shear stress. Therefore, when Ni is added, the Ni content is 0.50% or less. On the other hand, the lower limit of the Ni content is not particularly limited, from the viewpoint of increasing the addition effect of Ni, the Ni content is preferably 0.05% or more.

Sn: 0.50% or Less

Sn, like Cu, is an element that contributes to increasing the delayed fracture resistance by improving the corrosion resistance. However, a large amount of Sn addition decreases the bending collapsibility. Therefore, when Sn is added, the Sn content is 0.50% or less. On the other hand, the lower limit of the Sn content is not particularly limited, yet from the viewpoint of increasing the addition effect of Sn, the Sn content is preferably 0.05% or more.

Zn: 0.10% or Less

Zn is an element that increases the quench hardenability during hot pressing, and contributes to the formation of martensite, i.e., the increase in strength, after hot pressing. However, a large amount of Zn addition decreases the bending collapsibility. Therefore, when Zn is added, the Zn content is 0.10% or less. On the other hand, the lower limit of the Zn content is not particularly limited, yet from the viewpoint of increasing the addition effect of Zn, the Zn content is preferably 0.005% or more.

Co: 0.10% or Less

Co, like Cu and Ni, is also an element having the effect of improving the corrosion resistance by improving the hydrogen overpotential. Thus, the delayed fracture resistance can be improved by Co addition. However, a large amount of Co addition decreases the bending collapsibility. Therefore, when Co is added, the Co content is 0.10% or less. On the other hand, the lower limit of the Co content is not particularly limited, yet from the viewpoint of increasing the addition effect of Co, the Co content is preferably 0.005% or more.

Zr: 0.10% or Less

Zr, like Cu and Ni, is an element that contributes to improving the delayed fracture resistance by increasing the corrosion resistance. However, a large amount of Zr addition decreases the bending collapsibility. Therefore, when W is added, the W content is 0.10% or less. On the other hand, the lower limit of the Zr content is not particularly limited, yet from the viewpoint of increasing the addition effect of Zr, the Zr content is preferably 0.005% or more.

Ta: 0.10% or Less

Ta, like Ti, is an element that contributes to increasing the strength by forming carbides or nitrides. However, excessively adding Ta does not increase the addition effect, but rather ends up increasing the alloy cost. Therefore, when Ta is added, the Ta content is 0.10% or less. On the other hand, the lower limit of Ta content is not particularly limited, from the viewpoint of increasing the addition effect of Ta, it is preferable that the Ta content of 0.005% or more.

W: 0.10% or Less

W, like Cu and Ni, is an element that contributes to improving the delayed fracture resistance by improving the corrosion resistance. However, a large amount of W addition decreases the bending collapsibility. Therefore, when W is added, the W content is 0.10% or less. On the other hand, the lower limit of the W content is not particularly limited, yet from the viewpoint of increasing the addition effect of W, the W content is preferably 0.005% or more.

Further, the hot-pressed steel sheet member in another embodiment of the present disclosure may comprise a chemical composition containing C: 0.30% or more and less than 0.50%,
Si: 0.01% or more and 2.0% or less,
Mn: 0.5% or more and 3.5% or less,
Sb: 0.001% or more and 0.020% or less,
P: 0.05% or less,
S: 0.01% or less,
Al: 0.01% or more and 1.00% or less,
N: 0.01% or less,
optionally, Nb: 0.001% or more and 0.10% or less, and
optionally, at least one selected from the group consisting of
Mo: 0.35% or less,
Cr: 0.35% or less,
Ti: 0.15% or less,
B: 0.0050% or less,
Ca: 0.005% or less,
V: 0.05% or less,
Cu: 0.50% or less,
Ni: 0.50% or less,
Sn: 0.50% or less,
Zn: 0.10% or less,
Co: 0.10% or less,
Zr: 0.10% or less,
Ta: 0.10% or less, and
W: 0.10% or less,
with the balance being Fe and inevitable impurities.

[Microstructure]

Furthermore, it is important for the hot-pressed steel sheet member according to the present disclosure to have a steel sheet portion having a microstructure that satisfies the following conditions.

Average Grain Size of Prior Austenite Grains: 8 μm or Less

When the average grain size of prior austenite grains exceeds 8 μm, the toughness at the time of bending collapse is lowered, deteriorating the bending collapsibility. Therefore, the average grain size of prior austenite grains is set to 8 μm or less, and preferably 7 μm or less. On the other hand, the lower limit is not particularly limited, yet it is preferably 2 μm or more, more preferably 3 μm or more, and even more preferably 5 μm or more.

Martensite Volume Fraction: 90% or More

When the volume fraction of the martensite is less than 90%, it is difficult to obtain a tensile strength of 1780 MPa or more. Therefore, the volume fraction of the martensite is 90% or more, and preferably 95% or more. On the other hand, the upper limit of the volume fraction of the martensite is not particularly limited, yet it may be 100%. The microstructures other than the martensite are not particularly limited, and any microstructures may be contained. For example, the residual microstructures other than the martensite may be one or more selected from the group consisting of ferrite, bainite, and pearlite.

Solute C Content: 25% or Less of the Total C Content

When the solute C content exceeds 25% of the total C content, the toughness at the time of bending collapse decreases. Therefore, the solute C content is 25% or less of the total C content, preferably 20% or less, and more preferably 15% or less. On the other hand, the lower limit of the solute C content is not particularly limited, yet it is preferably 5% or more, more preferably 6% or more, of the total C content.

[Tensile Strength]

TS: 1780 MPa or More

The hot-pressed steel sheet member according to the present disclosure has a tensile strength (TS) of 1780 MPa or more. TS is preferably 1800 MPa or more, more preferably 1850 MPa or more, and even more preferably 1900 MPa or more. On the other hand, the upper limit of the TS is not particularly limited, yet it may usually be 2500 MPa or less or 2450 MPa or less.

[Yield Ratio]

In the case of the hot-pressed steel sheet member having a high yield ratio (YR), it is possible to further improve the collision safety when using the hot-pressed steel sheet member as an automotive member. Therefore, the yield ratio is preferably 65% or more, and more preferably 70% or more. Note that the yield ratio (YR) is a value defined as the ratio of yield strength YS to tensile strength TS, and specifically, can be calculated as YR=YS/TS×100(%).

[Coated or Plated Layer]

The hot-pressed steel sheet member according to the present disclosure may have no coated or plated layer. In that case, the hot-pressed steel sheet member is formed from a steel material having the chemical composition, microstructure, and tensile strength as described above. However, in order to prevent oxidation during hot pressing or to improve the corrosion resistance of the hot-pressed steel sheet member, it is preferable that the hot-pressed steel sheet member further comprises a coated or plated layer on the surface of the steel sheet. If the hot-pressed steel sheet member comprises a coated or plated layer on a surface thereof, the steel sheet portion excluding the coated or plated layer (i.e., the base steel sheet) has the chemical composition and microstructure described above.

As the coated or plated layer, an Al or Al alloy coated or plated layer or a Zn or Zn alloy coated or plated layer is preferred. By applying such a coated or plated layer to a surface of the steel sheet, it is possible to prevent the oxidation of the steel sheet surface caused by hot pressing, and to improve the corrosion resistance of the hot-pressed steel sheet member.

As used herein, the term "Zn or Zn alloy coated or plated layer" is intended to refer to a coated or plated layer containing Zn in an amount of 50 mass % or more. The Zn or Zn alloy coated or plated layer may be any of a Zn coated or plated layer and a Zn alloy coated or plated layer. The Zn or Zn alloy coated or plated layer may be a coated or plated layer made of an alloy containing Zn as a main component and at least one selected from the group consisting of Si, Mg, Ni, Fe, Co, Mn, Sn, Pb, Be, B, P, S, Ti, V, W, Mo, Sb, Cd, Nb, Cr, and Sr. Examples of the Zn or Zn alloy coated or plated layer that can be suitably used include a Zn—Ni alloy coated or plated layer.

As used herein, the Al or Al alloy coated or plated layer is intended to refer to a coated or plated layer containing Al in an amount of 50 mass % or more. The Al or Al alloy coated or plated layer may be any of an Al coated or plated layer and an Al alloy coated or plated layer. The Al or Al alloy coated or plated layer may be, for example, a coated or plated layer made of an alloy containing Al as well as at least one selected from the group consisting of Si, Mg, Ni, Fe, Co, Mn, Sn, Pb, Be, B, P, S, Ti, V, W, Mo, Sb, Cd, Nb, Cr, and Sr. One example of the Al or Al alloy coated or plated layer that can be suitably used is an Al—Si coated or plated layer.

The forming method of the coated or plated layer is not particularly limited, and the coated or plated layer may be formed in any way. For example, a hot dip coated layer which is a coated layer formed by hot dip coating, an electroplating layer which is a plated layer formed by electroplating, a vapor deposition coated layer which is a coated layer formed by vapor deposition coating, and the like are all applicable. In addition, the coated or plated layer may be a galvannealed layer which is a coated layer formed by applying an alloying treatment after the coating or plating step.

Examples of the Al or Al alloy coated or plated layer that can be suitably used include a hot-dip Al—Si coated or plated layer formed by hot dip coating. Further, examples of the Zn or Zn alloy coated or plated layer that can be suitably used include a hot-dip galvanized layer formed by hot dip coating, a galvannealed layer formed by alloying of a hot-dip galvanized layer, and a Zn electroplated layer or Zn—Ni alloy electroplated layer formed by electroplating. In particular, from the viewpoint of further improving the corrosion resistance of the hot pressed member and preventing the liquid metal brittle cracking caused by molten Zn during hot press forming, it is preferable to use a Zn—Ni alloy coated or plated layer as the Zn or Zn alloy coated or plated layer.

Note that when the steel sheet to which a coated or plated layer has been applied is subjected to hot pressing, some or all of the elements contained in the coated or plated layer are diffused into the base steel sheet, and may produce a solid solution phase or an intermetallic compound. Similarly, Fe, which is one of the components of the base steel sheet, is also diffused into the coated or plated layer, and may produce a solid solution phase or an intermetallic compound. In addition, an oxide layer may be formed on a surface of the coated or plated layer.

For example, when an Al—Si coated or plated layer is heated, the coated or plated layer changes to a coated or plated layer that is mainly composed of an Fe—Al intermetallic compound containing Si. Further, when a hot-dip galvanized layer, a galvannealed layer, an electroplated Zn layer, or the like is heated, an FeZn solid solution phase in which Zn is solid-dissolved in Fe, a ZnFe intermetallic compound, a ZnO layer on a surface layer, or the like is formed. Furthermore, when a Zn—Ni alloy electroplated layer is heated, a solid solution layer containing Ni in which plated layer components are solid-dissolved in Fe, an intermetallic compound mainly composed of ZnNi, a ZnO layer on the surface layer, or the like is formed.

As used herein, as described above, a coated or plated layer containing Al that is formed by heating a cold-rolled steel sheet for hot pressing to which an Al or Al-alloy coated or plated layer has been applied is referred to as an Al or Al-alloy coated or plated layer, and a coated or plated layer containing Zn that is formed by heating a hot-pressed cold-rolled steel sheet to which a Zn or Zn-alloy coated or plated layer has been applied is referred to as a Zn or Zn-alloy coated or plated layer.

The coating weight of the coated or plated layer is not particularly limited, and may be arbitrarily selected. However, since the coating weight per one side is less than 5 g/m$^2$ may become difficult to secure the corrosion resistance, it is preferable that the coating weight per one side is 5 g/m$^2$ or more. On the other hand, when the coating weight per one side exceeds 150 g/m$^2$, the resistance to coating exfoliation is deteriorated. Therefore, the coating weight per one side is preferably 150 g/m$^2$ or less.

[Production Method]

Next, a method for producing a hot-pressed steel sheet member according to the present disclosure will be described. The method for producing a hot-pressed steel sheet member according to the present disclosure is not particularly limited, yet in one embodiment, the following steps (1) to (4) may be applicable. The steps are specifically described below.

(1) Heating of a cold-rolled steel sheet
(2) Hot pressing
(3) Cooling (quenching)
(4) Heat treatment

[Cold-Rolled Steel Sheet]

The cold-rolled steel sheets used as the material have the above-described chemical composition. That is, the chemical composition of the steel sheet portion of each resulting hot-pressed steel sheet member is basically the same as that of the cold-rolled steel sheet used as the material.

The method for producing the cold-rolled steel sheet is not particularly limited, and any conventional method is applicable. For example, the cold-rolled steel sheet may be produced by hot rolling and then cold rolling a steel material (steel slab) having the above-described chemical composition. The cold-rolled steel sheet may be further subjected to temper rolling. When performing temper rolling, a preferred elongation ratio is 0.05% to 2.0%.

For example, a steel material (slab) having the above-described chemical composition is hot rolled under the condition of a rolling finish temperature of 860° C. to 950° C. to obtain a hot-rolled steel sheet. Then, the hot-rolled steel sheet is coiled at a coiling temperature of 650° C. or lower. At this point, after completion of the hot rolling, the hot-rolled steel sheet is cooled to the coiling temperature at a cooling rate of 5° C./s or higher. Then, the coiled hot-rolled steel sheet is taken out and pickled, and further cold rolled. After completion of the cold rolling, the steel sheet is subjected to a heat treatment whereby it is heated to a temperature range of 650° C. to 950° C. at an average heating rate of 2° C./s or higher, and subjected to 5 seconds or more of soaking in the temperature range. Then, the steel sheet is subjected to cooling whereby it is cooled to a cooling stop temperature of 600° C. or lower at an average cooling rate of 2° C./s or higher to obtain a cold-rolled steel sheet.

Note that the above production conditions are given by way of example, and the present disclosure is not limited thereto. This is because, in the method according to the present disclosure, it is possible to control the microstructure of the steel sheet by heating before hot pressing and cooling after hot pressing.

[Coating or Plating Treatment]

Although the above cold-rolled steel sheet may be subjected to the subsequent heating directly (i.e., without being subjected to coating or plating treatment), it may optionally be subjected to coating or plating treatment prior to the heating. The way of coating or plating treatment is not particularly limited, and any method such as hot-dip coating, electroplating, or vapor deposition plating can be used. After the coating or plating treatment, the steel sheet may also be subjected to alloying treatment.

[Heating]

Then, the cold-rolled steel sheet is heated to a heating temperature of an Ac3 transformation temperature or higher and 1000° C. or lower. When the heating temperature is lower than the Ac3 point, the austenite fraction in the heated steel sheet is lowered such that the volume fraction of the martensite is less than 90% after hot pressing, making it impossible to ensure the intended tensile strength. Further, when the heating temperature is higher than 1000° C., the grain size becomes excessively coarse, resulting in lower bending collapsibility. Here, the Ac3 transformation temperature can be determined by the following Expression (1):

$$\text{Ac3 transformation temperature (° C.)}=881-206C+53Si-15Mn-20Ni-1Cr-27Cu+41Mo \quad (1),$$

where each element symbol represents the content in mass % of the corresponding element. The content of any element not contained is calculated as 0.

The heating may be performed in any way without limitation, yet may generally be carried out using a heating furnace. The heating furnace may be, for example, an electric furnace, a gas furnace, an electrical resistance heating furnace, or a far infrared heating furnace.

Although the cold-rolled steel sheet may be subjected to hot pressing immediately after being heated to the heating temperature, it may be preferably held at the heating temperature for 0 seconds to 600 seconds. A holding time exceeding 600 seconds makes the grain size excessively coarse, resulting in lower bending collapsibility. Therefore, when performing holding, the holding time is 600 seconds or less.

[Hot Pressing]

Then, the heated cold-rolled steel sheet is conveyed to a press machine and subjected to hot pressing. The hot pressing is not limited to a particular method, and may be performed in any manner. The pressing temperature is not particularly limited, yet the hot pressing is preferably performed in a range of 550° C. to 800° C.

[Cooling]

The hot-pressed steel sheet is cooled to the Mf point or lower. By this cooling, the steel sheet heated to the Ac3 transformation temperature or higher by the above heating is cooled to the Mf point or lower. With this setup, the volume fraction of the austenite may be 90% or more. Note that the Mf point is the temperature at which the martensite transformation ends, and can be determined based on the continuous cooling transformation curve (CCT curve).

The cooling is not limited to a particular method, and may be performed in any manner. Usually, as is performed in a common hot pressing, it is suffice to perform cooling by contact with the mold. Note that the cooling may be started simultaneously with the hot pressing.

The rate of the cooling is not particularly limited, yet from the viewpoint of microstructural control, it is preferable that the average cooling rate within a temperature range of the cooling start temperature to 150° C. is 10° C./s or higher. For example, after the steel sheet is cooled by contact with the mold to a temperature of 150° C. or lower at an average cooling rate of 10° C./s or higher, the mold is released. Thereafter, the steel sheet may also be optionally allowed to naturally cool to room temperature.

[Heat Treatment]

Then, the cooled hot-pressed steel sheet is subjected to heat treatment under a set of conditions including a heating temperature of 50° C. to 300° C. and a holding time of 5 seconds to 3600 seconds. Through this heat treatment, the solute C content of the steel sheet can be adjusted to 25% or less of the total C content. When the heating temperature is lower than 50° C., the solute C content is increased, resulting in lower bending collapsibility. On the other hand, when the heating temperature exceeds 300° C., precipitated carbides are coarsened, resulting in lower tensile strength. Further, when the holding time is shorter than 5 seconds, the solute C content is increased, resulting in lower bending collapsibility. On the other hand, when the holding time exceeds 3600 seconds, precipitated carbides are coarsened, resulting in lower tensile strength.

EXAMPLES

Examples of the present disclosure will now be described below. It should be noted that the present disclosure is not limited by the embodiments described below, but may be implemented with appropriate modifications to the extent that may conform to the spirit of the present disclosure, all of which modifications are included in the technical scope of the present disclosure.

First, cold-rolled steel sheets used as the material for manufacture of hot-pressed steel sheet members were produced as follows.

Steel samples having the chemical compositions listed in Table 1 were prepared by steelmaking and cast into steel slabs. Each steel slab was hot rolled under a set of conditions including a hot rolling heating temperature of 1250° C. and a finisher delivery temperature (FDT) of 900° C. to obtain a hot-rolled steel sheet. The resulting hot-rolled steel sheet was coiled at a coiling temperature of 600° C.

The resulting hot-rolled steel sheet was taken out and pickled, and then cold rolled to obtain a cold-rolled steel sheet having a sheet thickness of 1.4 mm. The obtained cold-rolled steel sheet was subjected to annealing treatment in a continuous annealing line (CAL) or a continuous galvanizing line (CGL) to obtain a cold-rolled steel sheet (CR) or a hot-dip galvanized steel sheet (GI) as the final material.

Note that some of the steel sheets were subjected to alloying treatment after subjection to the hot-dip galvanizing treatment to obtain galvannealed steel sheets (GA). In addition, others were subjected to molten aluminum coating treatment to obtain hot-dip aluminum-coated steel sheets (GAS). Still others were subjected to plating in an electrogalvanization line (EGL) after subjection to the annealing at CAL, to obtain electrogalvanized steel sheets (EG) or zinc-nickel electroplated steel sheets (EZN).

Then, each of the resulting cold-rolled steel sheets was heated to the heating temperature listed in Table 2 and held for 60 seconds at the heating temperature. The heating was carried out in ambient air using an infrared heating furnace or an atmosphere heating furnace. The heating rate at the time of heating was 5° C./s.

Then, each of the heated steel sheets was conveyed to the press machine and hot pressed into a hat-shaped, hot-pressed steel sheet member. The steel sheet temperature during the hot pressing was set to 700° C. The mold used for the hot pressing had a punch width of 120 mm, a punch shoulder radius of 6 mm, and a die shoulder radius of 6 mm, and the forming depth was set to 40 mm.

Cooling was accomplished by combining contact cooling by squeezing each hot-pressed steel sheet member between the punch and the die and air cooling on the die after being released from the squeezing. The average cooling rate was adjusted to 100° C./s within a temperature range of the press start temperature to 150° C. The average cooling rate was adjusted by changing the time to hold the punch at the bottom dead center in the range of 1 second to 60 seconds.

After the air cooling to room temperature, each hot-pressed steel sheet member was subjected to heat treatment at the corresponding heating temperature and holding time listed in Table 2. Specifically, in an atmospheric furnace, each hot-pressed steel sheet member was heated to the above-described heating temperature, held for the above-described holding time, and subjected to air cooling.

Then, for each of the obtained hot-pressed steel sheet members, the microstructure, hardness distributions, tensile property, and bending collapsibility of the steel sheet portion were evaluated as described below.

(Microstructure)

Volume Fraction of Martensite

The volume fraction of martensite in the steel sheet portion of each hot-pressed steel sheet member was evaluated as follows. First, a cross section of each steel sheet taken along the sheet thickness direction to be parallel to the the rolling direction was polished and etched with a 3 vol % nital, and observed under a scanning electron microscope (SEM) at ×2000 and ×5000 magnification. Then, the area ratio of martensite was measured by a point counting method (in conformity with ASTM E562-83 (1988)), and the result was used as the volume fraction.

Average Grain Size of Prior Austenite Grains

The average grain size of prior austenite (prior y) grains was determined by image interpretation of the micrographs obtained by SEM observations in measuring the volume fraction of martensite described above. Specifically, the equivalent circular diameters were calculated by identifying the prior austenite grains in the micrographs, and the result of averaging the equivalent circular diameters was used as the average grain size of prior austenite grains. In the image interpretation, Image-Pro available from Media Cybernetics was used.

Solute C Content

The solute C content was determined by subtracting the C content precipitated as carbides ($C_p$) from the total C content in steel ($C_{total}$).

$C_{total}$

As the total C content in steel ($C_{total}$), the C content of each steel sheet listed in Table 1 (mass %) was used.

$C_p$

The carbides at first include cementite ($M_3C$). In addition, when Nb, Ti, and/or V are contained, their carbides (NbC, TiC, and/or VC) are precipitated. Therefore, the amount of C precipitated as carbides ($C_p$) can be obtained as the sum of the amount of C precipitated as cementite ($C_{p1}$) and the amount of C precipitated as NbC, TiC, and/or VC ($C_{p2}$).

$C_{p1}$

The amount of C precipitated as cementite was determined by the combined use of analysis by transmission electron microscope-energy dispersive X-ray spectroscopy (TEM-EDX) and ICP-emission analysis of the extracted residue obtained by electrolytic extraction. First, from each of the obtained hot-pressed steel sheet members, a TEM observation sample to be measured was prepared, and the concentrations of the metallic elements constituting the cementite were measured using EDX analysis. Here, the metallic elements constituting the cementite are Fe, Cr, and Mn. As the concentration, the result of averaging the measurements at 10 locations was used. From the obtained concentrations, the atomic ratios of Fe, Mn, and Cr represented as $F_{Fe}$, $F_{Cr}$, and $F_{Mn}$, respectively, were determined, where $F_{Fe}+F_{Cr}+F_{Mn}=1$.

Then, an extracted residue was obtained from each of the hot-pressed steel sheet members using electrolytic extraction. As the electrolyte solution, a 10% acetylacetone-based electrolyte solution was used. The resulting extracted residue was analyzed by radio frequency inductively coupled plasma (ICP) optical emission spectrometry to determine the amount of Fe precipitated as cementite in the steel $C_{Fe}$ (mass %).

Using the values obtained in the above measurements, the amount of C precipitated as cementite ($C_{p1}$) was calculated by:

$$C_{p1} \text{ (in mass \%)} = 12/(M \times 3) \times C_{Fe} \times 1/(F_{Fe}),$$

where $M=(56 \times F_{Fe}+52 \times F_{Cr}+54 \times F_{Mn})$.

$C_{p2}$

The amount of C precipitated as NbC, TiC, and/or VC, ($C_{p2}$), was determined as follows. First, an extracted residue was obtained from each of the hot-pressed steel members using electrolytic extraction. As the electrolyte solution, a 10% acetylacetone-based electrolyte solution was used. The resulting extraction residue was analyzed by radio frequency inductively coupled plasma (ICP) optical emission spectrometry, and the content of Nb, Ti, and/or V were measured. The measured amounts of Nb, Ti, and/or V are the amounts of the metal elements precipitated as NbC, TiC, and/or VC. Therefore, from the measured values, the amounts of C precipitated as NbC, TiC, and/or VC, ($C_{p2}$), were calculated.

From $C_{p1}$ and $C_{p2}$ obtained as described above, the solute C content was calculated by:

[solute C content (in mass %)]=$C_{total}$−($C_{p1}$+$C_{p2}$).

(Hardness Distributions)
As an index of the dispersion of hardness, the standard deviation ($\sigma_{Hv}$) of Vickers hardness was obtained. Specifically, the Vickers hardness on the steel sheet surface after hot pressing was measured 10 times every 500 μm in the rolling direction and a direction perpendicular thereto, respectively, thus at a total of 100 points, and the standard deviation of the measured values was determined. For the Vickers hardness measurement conditions, the test force was 3000 g and the holding time was 30 seconds.

(Tensile Property)
A JIS No. 5 tensile test piece was taken from a position at the hat bottom of each of the obtained hot-pressed steel sheet members, and subjected to tensile test in accordance with JIS Z 2241 to measure the yield strength (YS) and the tensile strength (TS).

(Bending Collapsibility)
Each of the obtained hot-pressed steel sheet members was subjected to a three-point bending deformation to measure the strokes and loads. In the 3-point bending deformation, a mold with 280 mm span and punch 100R was used and the test speed was set to 0.1 m/s. The bending collapsibility was judged "excellent" when the bottom dead center was reached without cracking even when the maximum load was exceeded, "good" when the maximum load was exceeded although cracking occurred, or "poor" when cracking occurred and fracture was observed partway through the evaluation before exceeding the maximum load.

The measured steel sheet microstructure, tensile property, and bending collapsibility are listed in Table 3. As can be seen from this result, each hot-pressed steel sheet member satisfying the conditions of the present disclosure had a tensile strength of 1780 MPa or more and excellent bending collapsibility.

TABLE 1

| Steel ID | Chemical composition (mass %) * | | | | | | | | | C/Nb | Remarks |
|---|---|---|---|---|---|---|---|---|---|---|---|
| | C | Si | Mn | Sb | Nb | P | S | Al | N | Other components | | |
| A | 0.34 | 0.34 | 2.13 | 0.010 | — | 0.01 | 0.001 | 0.03 | 0.002 | — | — | Conforming steel |
| B | 0.37 | 0.65 | 1.77 | 0.005 | — | 0.01 | 0.001 | 0.03 | 0.002 | — | — | Conforming steel |
| C | 0.35 | 0.15 | 1.22 | 0.008 | 0.011 | 0.01 | 0.002 | 0.03 | 0.002 | — | 32 | Conforming steel |
| D | 0.35 | 0.22 | 1.45 | 0.012 | 0.008 | 0.01 | 0.001 | 0.03 | 0.002 | Ti: 0.02, B: 0.0021, Cr: 0.20 | 44 | Conforming steel |
| E | 0.30 | 1.88 | 3.11 | 0.003 | 0.005 | 0.01 | 0.001 | 0.02 | 0.003 | V: 0.03, Cu: 0.15, Sn: 0.08, Zr: 0.03 | 60 | Conforming steel |
| F | 0.41 | 0.05 | 0.65 | 0.019 | 0.018 | 0.02 | 0.008 | 0.79 | 0.002 | Mo: 0.31, Co: 0.05, Zn: 0.03, W: 0.02 | 23 | Conforming steel |
| G | 0.45 | 0.22 | 2.40 | 0.012 | 0.012 | 0.01 | 0.002 | 0.03 | 0.002 | Ni: 0.21, Ta: 0.03, Ca: 0.001 | 38 | Conforming steel |
| H | 0.31 | 0.33 | 1.66 | 0.006 | 0.009 | 0.04 | 0.002 | 0.03 | 0.002 | Ca: 0.001 | 34 | Conforming steel |
| I | 0.21 | 0.23 | 1.33 | 0.012 | 0.005 | 0.01 | 0.001 | 0.03 | 0.003 | — | 42 | Comparative steel |
| J | 0.55 | 0.34 | 1.88 | 0.008 | 0.024 | 0.01 | 0.001 | 0.03 | 0.002 | — | 23 | Comparative steel |
| K | 0.34 | 0.45 | 1.44 | 0.031 | 0.011 | 0.01 | 0.001 | 0.03 | 0.003 | — | 31 | Comparative steel |
| L | 0.33 | 0.09 | 2.33 | — | 0.010 | 0.01 | 0.001 | 0.03 | 0.002 | — | 33 | Comparative steel |

*The balance is Fe and inevitable impurities.

TABLE 2

| No. | Steel sample ID | Coating or plating * | Heating before hot pressing Heating temp. (° C.) | Heat treatment Heating temp. (° C.) | Heat treatment Holding time (s) | Remarks |
|---|---|---|---|---|---|---|
| 1 | A | EZN | 900 | 120 | 1500 | Example |
| 2 | B | EZN | 900 | 170 | 1200 | Example |
| 3 | C | EZN | 900 | 150 | 1800 | Example |
| 4 | D | EZN | 900 | 170 | 1200 | Example |
| 5 | E | EZN | 900 | 60 | 1000 | Example |
| 6 | F | EZN | 900 | 260 | 30 | Example |
| 7 | G | EZN | 900 | 200 | 600 | Example |
| 8 | H | EZN | 900 | 170 | 1500 | Example |
| 9 | A | GAS | 900 | 150 | 1400 | Example |
| 10 | B | CR | 900 | 140 | 1200 | Example |
| 11 | C | GI | 900 | 150 | 1400 | Example |
| 12 | D | CR | 900 | 150 | 1400 | Example |
| 13 | E | EG | 900 | 150 | 1400 | Example |
| 14 | F | GI | 900 | 150 | 1400 | Example |
| 15 | G | GA | 900 | 150 | 1400 | Example |
| 16 | H | CR | 900 | 150 | 1400 | Example |
| 17 | A | EG | 900 | 200 | 1000 | Example |
| 18 | D | CR | 900 | 100 | 3000 | Example |
| 19 | C | EZN | 700 | 150 | 1400 | Comparative Example |

TABLE 2-continued

| No. | Steel sample ID | Coating or plating * | Heating before hot pressing Heating temp. (° C.) | Heat treatment Heating temp. (° C.) | Heat treatment Holding time (s) | Remarks |
|---|---|---|---|---|---|---|
| 20 | C | GA | 1100 | 150 | 1400 | Comparative Example |
| 21 | C | EZN | 900 | — | — | Comparative Example |
| 22 | C | GA | 900 | 40 | 1000 | Comparative Example |
| 23 | C | CR | 900 | 350 | 1000 | Comparative Example |
| 24 | C | GAS | 900 | 150 | 3 | Comparative Example |
| 25 | C | CR | 900 | 150 | 6000 | Comparative Example |
| 26 | I | CR | 900 | 150 | 1400 | Comparative Example |
| 27 | J | CR | 900 | 150 | 1400 | Comparative Example |
| 28 | K | CR | 900 | 150 | 1400 | Comparative Example |
| 29 | L | CR | 900 | 150 | 1400 | Comparative Example |

* CR: cold-rolled steel sheet, GI: hot-dip galvanized steel sheet, GA: galvannealed steel sheet GAS: hot-dip aluminum coated steel sheet, EG: electrogalvanized steel sheet, EZN: zinc-nickel electroplated steel sheet

TABLE 3

| No. | Microstructure of hot-pressed steel sheet member Volume fraction of martensite (%) | Microstructure of hot-pressed steel sheet member Average grain size of prior γ grains (μm) | Solute C content/ Total C content (%) | Tensile properties YS (MPa) | Tensile properties TS (MPa) | Hardness distribution $\sigma_{Hv}$* | Bending collapsibility | Remarks |
|---|---|---|---|---|---|---|---|---|
| 1 | 100 | 7 | 12 | 1338 | 1923 | 32 | good | Example |
| 2 | 98 | 6 | 10 | 1450 | 2109 | 35 | good | Example |
| 3 | 100 | 5 | 6 | 1420 | 2033 | 30 | excellent | Example |
| 4 | 99 | 6 | 10 | 1334 | 1854 | 34 | excellent | Example |
| 5 | 99 | 7 | 22 | 1258 | 1924 | 33 | excellent | Example |
| 6 | 99 | 6 | 8 | 1594 | 2254 | 30 | excellent | Example |
| 7 | 99 | 6 | 11 | 1634 | 2455 | 25 | excellent | Example |
| 8 | 98 | 6 | 8 | 1355 | 1921 | 34 | excellent | Example |
| 9 | 100 | 7 | 11 | 1443 | 2041 | 35 | good | Example |
| 10 | 97 | 6 | 10 | 1395 | 2101 | 41 | good | Example |
| 11 | 100 | 7 | 8 | 1404 | 1944 | 32 | excellent | Example |
| 12 | 99 | 6 | 7 | 1338 | 1834 | 33 | excellent | Example |
| 13 | 99 | 5 | 8 | 1380 | 1921 | 35 | excellent | Example |
| 14 | 99 | 6 | 8 | 1551 | 2246 | 42 | excellent | Example |
| 15 | 99 | 6 | 8 | 1677 | 2551 | 33 | excellent | Example |
| 16 | 100 | 7 | 9 | 1389 | 2013 | 35 | excellent | Example |
| 17 | 99 | 6 | 8 | 1388 | 1891 | 32 | excellent | Example |
| 18 | 100 | 7 | 9 | 1473 | 2013 | 33 | excellent | Example |
| 19 | 62 | 7 | 10 | 1002 | 1413 | 35 | excellent | Comparative Example |
| 20 | 100 | 10 | 10 | 1443 | 1992 | 43 | poor | Comparative Example |
| 21 | 99 | 7 | 30 | 1182 | 1913 | 42 | poor | Comparative Example |
| 22 | 100 | 6 | 38 | 1177 | 1932 | 48 | poor | Comparative Example |
| 23 | 99 | 7 | 3 | 1221 | 1721 | 51 | excellent | Comparative Example |
| 24 | 99 | 6 | 27 | 1181 | 1923 | 45 | poor | Comparative Example |
| 25 | 99 | 6 | 4 | 1231 | 1688 | 43 | excellent | Comparative Example |
| 26 | 100 | 7 | 5 | 1025 | 1504 | 45 | excellent | Comparative Example |
| 27 | 99 | 6 | 24 | 1765 | 2612 | 43 | poor | Comparative Example |
| 28 | 99 | 6 | 12 | 1188 | 1899 | 43 | poor | Comparative Example |
| 29 | 93 | 7 | 9 | 1224 | 1831 | 92 | poor | Comparative Example |

*The standard deviation of Vickers hardness.

The invention claimed is:

1. A hot-pressed steel sheet member, comprising:
a chemical composition containing, in mass %,
C: 0.30% or more and less than 0.50%,
Si: 0.01% or more and 2.0% or less,
Mn: 0.5% or more and 3.5% or less,
Sb: 0.001% or more and 0.020% or less,
P: 0.05% or less,
S: 0.01% or less,
Al: 0.01% or more and 1.00% or less, and
N: 0.01% or less,
with the balance being Fe and inevitable impurities;
a microstructure in which an average grain size of prior austenite grains is 8 μm or less, a volume fraction of martensite is 90% or more, and a solute C content is 25% or less of a total C content; and
a tensile strength of 1780 MPa or more.

2. The hot-pressed steel sheet member according to claim 1, wherein the chemical composition further contains, in mass %, Nb: 0.003% or more and 0.018% or less, and a ratio of a C content in mass % to a Nb content in mass %, C/Nb, is from 22 to 100.

3. The hot-pressed steel sheet member according to claim 2, wherein the chemical composition further contains, in mass %, at least one selected from the group consisting of
Mo: 0.35% or less,
Cr: 0.35% or less,
Ti: 0.15% or less,
B: 0.0050% or less,
Ca: 0.005% or less,
V: 0.05% or less,
Cu: 0.50% or less,
Ni: 0.50% or less,
Sn: 0.50% or less,
Zn: 0.10% or less,
Co: 0.10% or less,
Zr: 0.10% or less,
Ta: 0.10% or less, and
W: 0.10% or less.

4. The hot-pressed steel sheet member according to claim 3, further comprising, on a surface thereof, an Al or Al-alloy coated or plated layer or a Zn or Zn-alloy coated or plated layer.

5. The hot-pressed steel sheet member according to claim 2, further comprising, on a surface thereof, an Al or Al-alloy coated or plated layer or a Zn or Zn-alloy coated or plated layer.

6. The hot-pressed steel sheet member according to claim 1, wherein the chemical composition further contains, in mass %, at least one selected from the group consisting of
Mo: 0.35% or less,
Cr: 0.35% or less,
Ti: 0.15% or less,
B: 0.0050% or less,
Ca: 0.005% or less,
V: 0.05% or less,
Cu: 0.50% or less,
Ni: 0.50% or less,
Sn: 0.50% or less,
Zn: 0.10% or less,
Co: 0.10% or less,
Zr: 0.10% or less,
Ta: 0.10% or less, and
W: 0.10% or less.

7. The hot-pressed steel sheet member according to claim 6, further comprising, on a surface thereof, an Al or Al-alloy coated or plated layer or a Zn or Zn-alloy coated or plated layer.

8. The hot-pressed steel sheet member according to claim 1, further comprising, on a surface thereof, an Al or Al-alloy coated or plated layer or a Zn or Zn-alloy coated or plated layer.

9. A method for producing the hot-pressed steel sheet member according to claim 6, comprising:
heating a cold-rolled steel sheet having the chemical composition as recited in claim 1 to a heating temperature of an Ac3 transformation temperature or higher and 1000° C. or lower;
hot pressing the heated cold-rolled steel sheet to obtain a hot-pressed steel sheet;
cooling the hot-pressed steel sheet to Mf point or lower; and
subjecting the cooled hot-pressed steel sheet to heat treatment under a set of conditions including a heating temperature of 50° C. to 300° C. and a holding time of 5 seconds to 3600 seconds.

10. A method for producing the hot-pressed steel sheet member according to claim 2, comprising:
heating a cold-rolled steel sheet having the chemical composition as recited in claim 7 to a heating temperature of an Ac3 transformation temperature or higher and 1000° C. or lower;
hot pressing the heated cold-rolled steel sheet to obtain a hot-pressed steel sheet;
cooling the hot-pressed steel sheet to Mf point or lower; and
subjecting the cooled hot-pressed steel sheet to heat treatment under a set of conditions including a heating temperature of 50° C. to 300° C. and a holding time of 5 seconds to 3600 seconds.

11. A method for producing the hot-pressed steel sheet member according to claim 6, comprising:
heating a cold-rolled steel sheet having the chemical composition as recited in claim 8 to a heating temperature of an Ac3 transformation temperature or higher and 1000° C. or lower;
hot pressing the heated cold-rolled steel sheet to obtain a hot-pressed steel sheet;
cooling the hot-pressed steel sheet to Mf point or lower; and
subjecting the cooled hot-pressed steel sheet to heat treatment under a set of conditions including a heating temperature of 50° C. to 300° C. and a holding time of 5 seconds to 3600 seconds.

12. A method for producing the hot-pressed steel sheet member according to claim 3, comprising:
heating a cold-rolled steel sheet having the chemical composition as recited in claim 9 to a heating temperature of an Ac3 transformation temperature or higher and 1000° C. or lower;
hot pressing the heated cold-rolled steel sheet to obtain a hot-pressed steel sheet;
cooling the hot-pressed steel sheet to Mf point or lower; and
subjecting the cooled hot-pressed steel sheet to heat treatment under a set of conditions including a heating temperature of 50° C. to 300° C. and a holding time of 5 seconds to 3600 seconds.

* * * * *